(12) United States Patent
Sundholm

(10) Patent No.: US 8,366,368 B2
(45) Date of Patent: *Feb. 5, 2013

(54) LOCK RING

(75) Inventor: Göran Sundholm, Tuusula (FI)

(73) Assignee: Maricap Oy, Vantaa (FI)

( * ) Notice: Subject to any disclaimer, the term of this patent is extended or adjusted under 35 U.S.C. 154(b) by 336 days.

This patent is subject to a terminal disclaimer.

(21) Appl. No.: 12/742,772

(22) PCT Filed: Nov. 10, 2008

(86) PCT No.: PCT/FI2008/050646
§ 371 (c)(1),
(2), (4) Date: May 13, 2010

(87) PCT Pub. No.: WO2009/063131
PCT Pub. Date: May 22, 2009

(65) Prior Publication Data
US 2010/0247271 A1   Sep. 30, 2010

(30) Foreign Application Priority Data
Nov. 14, 2007   (FI) .......................... 20075806

(51) Int. Cl.
*F16B 21/18* (2006.01)
(52) U.S. Cl. ........................ 411/517; 411/909

(58) Field of Classification Search .............. None
See application file for complete search history.

(56) References Cited

U.S. PATENT DOCUMENTS

| | | | | |
|---|---|---|---|---|
| 2,255,217 A * | 9/1941 | Hill | | 411/517 |
| 2,423,848 A * | 7/1947 | O'Connor | | 33/613 |
| 3,222,096 A * | 12/1965 | Kaman | | 403/372 |
| 4,489,964 A | 12/1984 | Kipp et al. | | |
| 5,366,331 A * | 11/1994 | Erbes | | 411/433 |
| 5,621,183 A | 4/1997 | Bailey | | |
| 7,485,142 B2 * | 2/2009 | Milo | | 623/2.11 |
| 2003/0184023 A1 | 10/2003 | Masuyama et al. | | |
| 2004/0236419 A1* | 11/2004 | Milo | | 623/2.36 |
| 2005/0131517 A1* | 6/2005 | Hartley et al. | | 623/1.13 |
| 2005/0131518 A1* | 6/2005 | Hartley et al. | | 623/1.13 |

FOREIGN PATENT DOCUMENTS

| | | |
|---|---|---|
| EP | 0153465 A2 | 9/1985 |
| JP | 2-97779 A | 4/1990 |
| JP | 2006-104942 A | 4/2006 |
| RU | 2203446 C2 | 4/2003 |

* cited by examiner

*Primary Examiner* — Gary Estremsky
(74) *Attorney, Agent, or Firm* — Birch, Stewart, Kolasch & Birch, LLP

(57) ABSTRACT

A lock ring (6), which comprises a core part (61) and a twisted wire part (62) around it. The lock ring (6) comprises shape memory alloy or bimetal, whereby the lock ring is arranged to deform as the temperature changes to a predetermined value.

20 Claims, 4 Drawing Sheets

LOCK RING

BACKGROUND OF INVENTION

The invention relates to a lock ring.

The invention generally relates to retainer means, particularly lock rings.

Shape memory alloy parts are known which deform in a certain training temperature. It is typical for the shape memory alloy parts that they are extremely elastic i.e. ductile at least in a untrained position, whereby they are not suitable as such to be used as lock rings which are required rigidity in all situations. Furthermore, wires comprising shape memory alloy are typically quite thin of their diameter, whereby they are not suitable for targets in which the ring part of the lock ring is required adequate thickness in the target, e.g. due to quite large tolerances of the target of use. When using thicker shape memory alloy wires/bars, a problem is again their slower response to a change in temperature, whereby deformation occurs too slowly for some targets of application.

An object of this invention is to provide a totally novel arrangement into connection with lock rings, in which a lock ring can be made to deform based on temperature. Another object is to provide a lock ring which deforms based on temperature, by means of which disadvantages of known prior art are avoided.

BRIEF DESCRIPTION OF INVENTION

The invention is based on an idea in which a lock ring is formed of at least two parts, a core part consisting of at least one piece and a twisted wire part being on top of it.

Specified in more detail, the lock ring according to the invention is mainly characterised in that the lock ring comprises shape memory alloy or bimetal, whereby the lock ring is arranged to deform when the temperature changes to a predetermined value.

The arrangement according to the invention has numerous significant advantages. The shape of the lock ring changes automatically as long as an adequate thermal effect is applied to it. By using two different elements in the lock ring according to the invention, it is possible with one to provide a required spring or force-receiving effect, whereas the shape memory alloy part provides desired deformation in the predetermined temperature. The part of the lock ring comprising shape memory alloy can operate as such also as a heating element realising the deformation if an electric current is switched through it. Then, it is possible to provide a more extensive system with an automatic control. By means of the invention, it is possible to use in the lock ring a thinner shape memory alloy wire, by means of which is provided a quick response to a change in temperature and thus quick deformation.

BRIEF DESCRIPTION OF FIGURES

Next, the invention will be described in detail by means of an example with reference to the accompanying drawings in which.

DETAILED DESCRIPTION OF INVENTION

FIGS. 1-4 show an embodiment of a lock ring 6 according to the invention.

Figure 1:
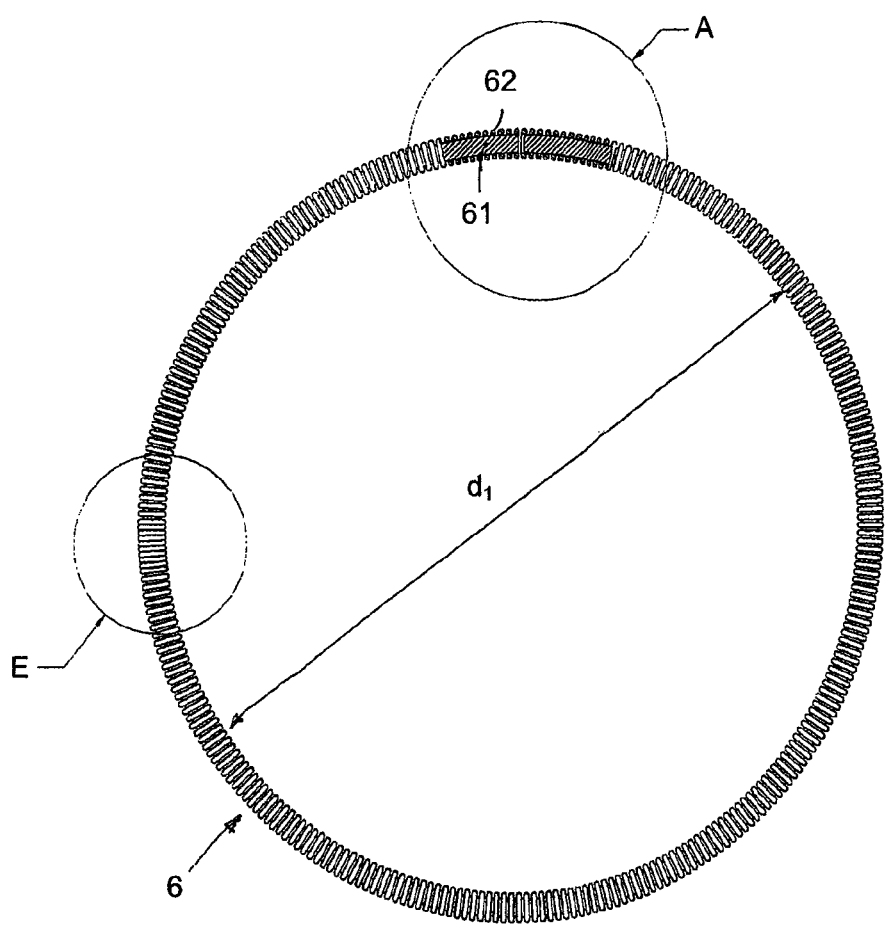
FIG. 1 shows a lock ring in accordance with an embodiment according to the invention in a first position.
Figures 2, 10:
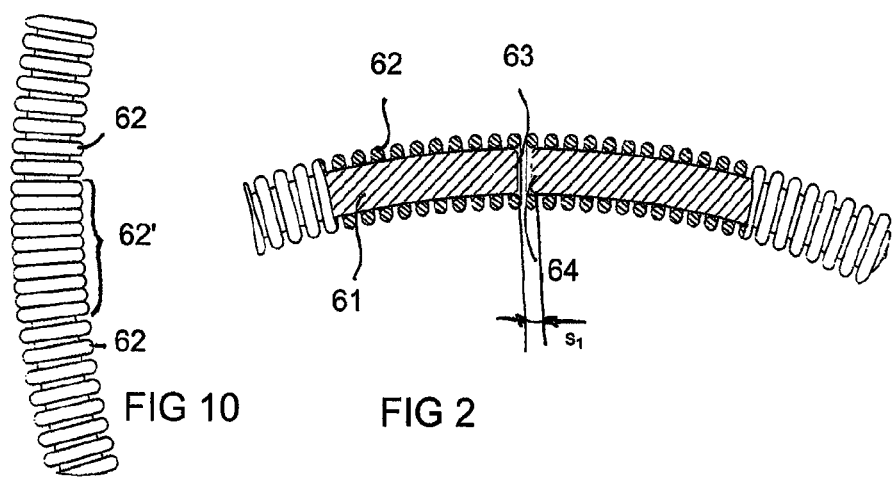
FIG. 2 shows an enlarged view of a detail A of FIG. 1.
FIG. 10 shows an enlarged view of a detail E of FIG. 1.
Figure 3:
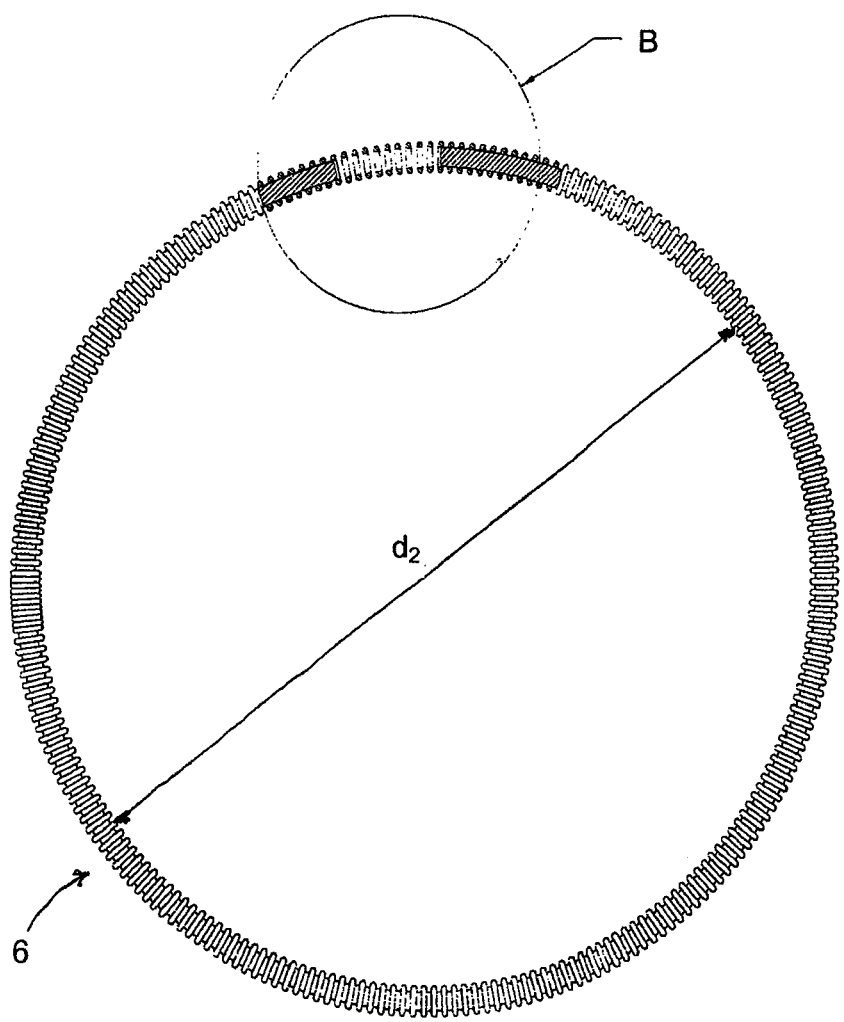
FIG. 3 shows a lock ring in accordance with an embodiment according to the invention in a second position.
Figure 4:
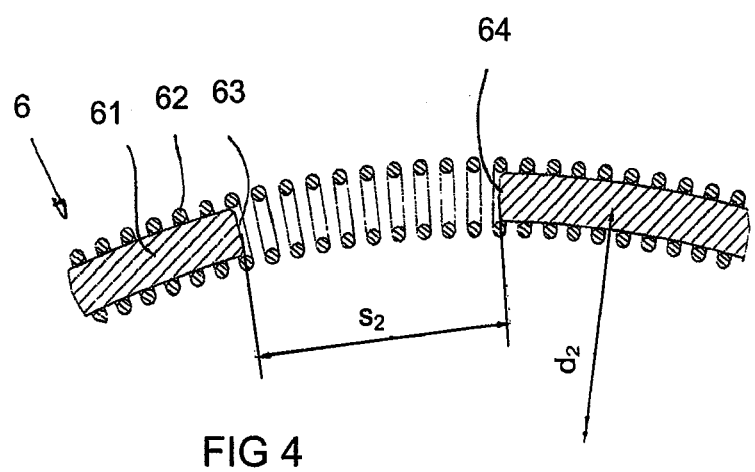
FIG. 4 shows an enlarged view of a detail B of FIG. 3.
Figure 5:
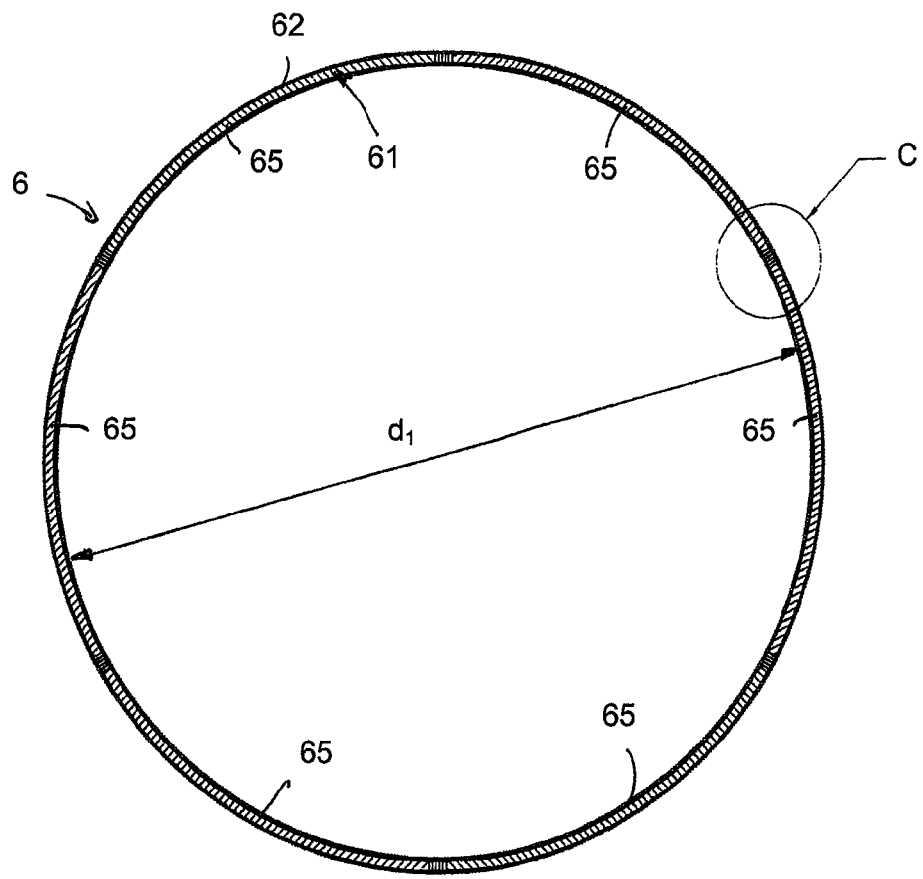
FIG. 5 shows another lock ring in accordance with an embodiment according to the invention in a first position as cut.
Figure 6:
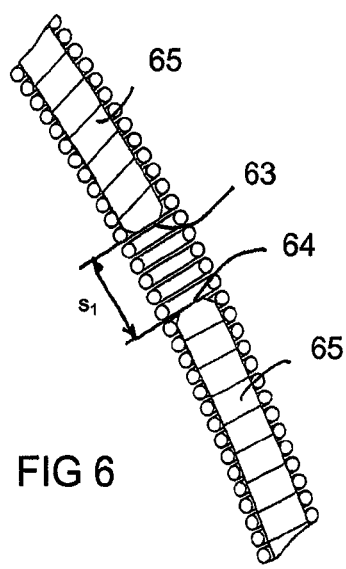
FIG. 6 shows an enlarged view of a detail C of FIG. 5.
Figure 7:
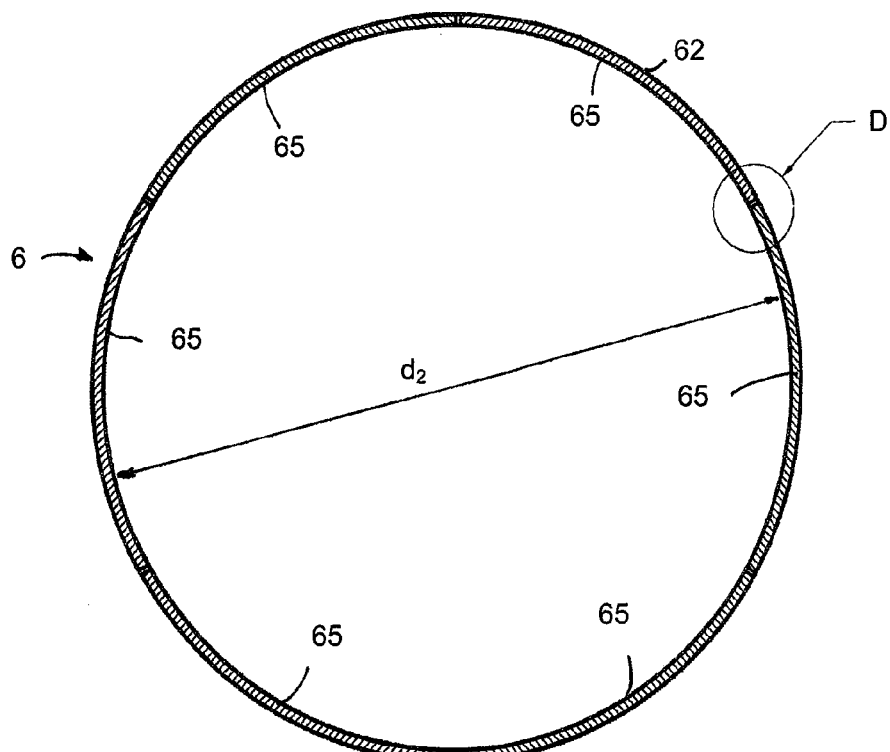
FIG. 7 shows another lock ring in accordance with an embodiment according to the invention in a second position as cut.
Figure 8:
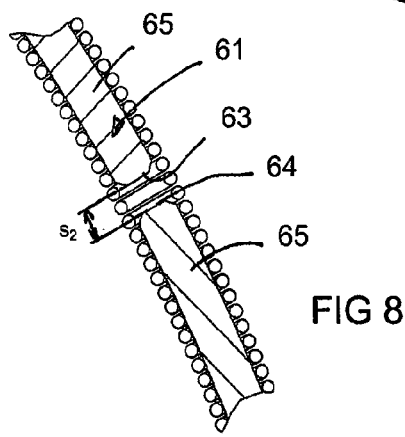
FIG. 8 shows an enlarged view of a detail D of FIG. 7.
Figure 9:
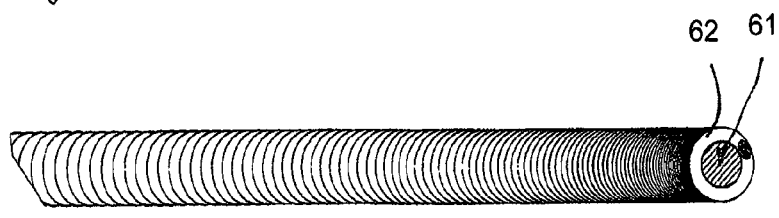
FIG. 9 shows a cross-section of a lock ring according to an embodiment.

The lock ring 6 is arranged to deform in a certain temperature. In FIG. 1, the lock ring is shown in a first position and, in FIG. 3, in a second position. In the embodiment of the figures, the lock ring 6 is an annular part, whereby in the first position the circle of the lock ring has a first length and it has a first diameter $d_1$ when it is annular. In the second position, the lock ring 6 has a second length which is in the embodiment of the figures larger than the first length. In the embodiment of FIG. 3, the lock ring 6 has in the second position a second diameter $d_2$ when its shape is annular, whereby the lock ring 6 increases when deforming.

The lock ring 6 advantageously comprises shape memory alloy (SMA). The shape memory alloy can have a predetermined temperature in which the deformation occurs.

In the embodiment of the figures, the lock ring 6 comprises a core part 61 and a twisted wire part 62 around it. According to the first embodiment, the core part 61 is formed of shape memory alloy. Then, at a temperature $T_1$ i.e. the normal temperature, the shape memory alloy wire forming the core part is ductile and the outer twisted wire part 62 pulls a first end 63 and a second end 64 of the core part 61 together operating like a coil spring. In the figure, between the first end 63 and the second end 64 of the core part 61 there is a spacing $s_1$.

When the temperature reaches a second temperature $T_2$, i.e. the training temperature of shape memory alloy, the core part 61 deforms in a trained way. In the embodiment according to the invention, the core part functions like spring steel after the temperature has risen to the training temperature $T_2$ or above it. The diameter of the lock ring 6 increases to the diameter $d_2$ and the length of its circle increases. The ends 63, 64 of the core part thus move to a spacing $s_2$ from each other. In FIGS. 1-4, $s_2$ is larger than $s_1$. Equivalently, the diameter $d_2$ of the lock ring 6 is larger in the second position than the diameter $d_1$ in the first position.

According to the second embodiment, the twisted wire part 62 is of shape memory alloy, whereby its length changes after the temperature has reached a predetermined value. The core part is then in the first position a spring element which also receives forces prevailing sidewards of the lock ring thus operating as a reinforcement part of the lock ring. Then after the temperature has reached the predetermined value $T_2$, the twisted wire part 62 of the lock ring deforms in a trained way i.e., in FIGS. 1-4, increases the diameter of the ring from the first diameter $d_1$ to the second diameter $d_2$.

According to another embodiment (FIGS. 5-8), the length of the circle of the lock ring 6 shortens (and the diameter d decreases) from the first position to the second position the temperature changing to the predetermined value $T_2$. Then, the length of the lock ring 6 shortens and the diameter decreases from the first diameter $d_1$ to the second diameter $d_2$ after the temperature has reached the predetermined value $T_2$.

Then, the core part 61 is formed of several core pieces 65 which are arranged in the twisted wire part 62 and fill a space remaining inside the circles of the twisted wire part 62 when applicable. When the twisted wire part 62 shortens as a result of deformation, there has to be gaps between the adjacent core pieces 65 of the core part in the first position in order for the deformation be possible. In the embodiment of the figure, the spacing between adjacent pieces decreases from the value $s_1$ to the value $s_2$. Then, as the twisted wire part is compressed together, the length of the ring circle shortens and the diameter d decreases from the value $d_1$ to the value $d_2$ ($d_1 > d_2$).

According to a further embodiment of the invention, the lock ring 6 is an annular part the diameter d of which increases as the temperature reaches the predetermined value $T_2$ from the first diameter $d_1$ to the second diameter $d_2$ ($d_1 < d_2$).

According to an additional embodiment of the invention, the lock ring 6 is an annular part the diameter d of which decreases as the temperature reaches the predetermined value $T_2$ from the first diameter to the second diameter ($d_1 > d_2$). Typically, the temperature reaches the predetermined value $T_2$ in a fire situation. The predetermined value $T_2$ can be e.g. 70-100 degrees C.

According to an advantageous embodiment, the core part of the lock ring comprises shape memory alloy.

According to another embodiment, the twisted wire part of the lock ring comprises shape memory alloy.

According to an advantageous embodiment, the lock ring 6 comprises a core part 61 and a twisted wire part 62. Then, at least one of the parts of the lock ring can comprise shape memory alloy. Then, it is also possible to spare shape memory alloy by producing the other part of some other material without the functionality suffering.

According to an embodiment, the core part 61 of the lock ring 6 is of shape memory alloy.

According to another embodiment, the twisted wire part 62 of the lock ring 6 is of shape memory alloy.

The invention thus relates to a lock ring 6 which comprises a core part 61 and a twisted wire part 62 around it. According to the invention, the lock ring comprises shape memory alloy, whereby the lock ring 6 is arranged to deform as the temperature changes to a predetermined value.

According to an advantageous embodiment, the lock ring 6 is an annular part the diameter d of which increases when the temperature reaches a predetermined value.

According to another advantageous embodiment, the lock ring 6 is an annular part the diameter d of which decreases when the temperature reaches a predetermined value.

According to an advantageous embodiment, the core part 61 of the lock ring 6 comprises shape memory alloy. According to a second embodiment, the twisted wire part 62 of the lock ring comprises shape memory alloy. According to a third embodiment, the core part 61 is formed of several core pieces 65. The core pieces can be parts successively arranged as in FIGS. 5 and 7 or parallel wire or bar parts i.e. strands.

The twisted wire part 62 can be formed of spring material when the core part 61 comprises shape memory alloy. Equivalently, the core part 61 is formed of spring material when the twisted wire part 62 comprises shape memory alloy.

The twisted wire part 62 is formed of steel when the core part 61 comprises shape memory alloy. Naturally, the twisted wire part can be of some other suitable material, such as steel.

The core part 61 is formed of steel when the twisted wire part 62 comprises shape memory alloy.

The core part 61 can thus comprise several parallel wire or bar parts i.e. strands of shape memory alloy.

The lock ring comprising shape memory alloy can also be remote controlled by connecting electric wires to it, whereby the shape memory alloy element of the core part or the twisted wire part functions as a thermal element. The risen temperature of the element makes the lock ring move from the first position to the second position. The part of the lock ring comprising shape memory alloy can be connected to be a part of an electric circuit in which an electric current can be switched on. By switching the electric wires controllably on, the lock rings can be adjusted one by one or as groups of several lock rings.

This specification does not describe how to 'train' the lock ring comprising shape memory alloy, but it is assumed known as such from the other applications of shape memory alloys. The used shape memory alloy can be any suitable shape memory alloy. An alloy extensively used as shape memory alloy is e.g. Nitinol i.e. NiTi alloy.

The lock ring can be partly or totally formed of some other material acting correspondingly. An alternative arrangement is e.g. bimetal. Equivalently, e.g. the core part of the lock ring can be formed of bimetal. The bimetal is a strip made of two metals expanding in different ways. The strips are connected fast to each other such that they are able to expand freely. This provides the fact that a change in temperature changes the form of the strip. The bimetal deflects in a different direction when heating up compared to when cooling down.

It is obvious to those skilled in the art that the invention is not limited to the embodiments described above, but it may be varied within the scope of the enclosed claims. When necessary, the features possibly described in this specification together with other features may also be used separately from each other.

The invention claimed is:

1. A lock ring (6), comprising:
a core part (61); and
a twisted wire part (62) formed around the core part;
wherein the lock ring comprises shape memory alloy or bimetal, whereby the lock ring is arranged to deform as the temperature changes to a predetermined value;
wherein the core part (61) includes a first end (63) and a second end (64) spaced a first predetermined distance from each other within the twisted wire part (62) at a first temperature and said first end (63) and said second end (64) being spaced a second predetermined distance from each other at a second predetermined temperature.

2. The lock ring according to claim 1, wherein the lock ring (6) is an annular part with a diameter (d) of which increases when the temperature reaches the predetermined value.

3. The lock ring according to claim 1, wherein the lock ring (6) is an annular part with a diameter (d) of which decreases when the temperature reaches the predetermined value.

4. The lock ring according to claim 1, wherein the core part (61) of the lock ring (6) comprises shape memory alloy.

5. The lock ring according to claim 1, wherein the twisted wire part (62) of the lock ring comprises shape memory alloy.

6. The lock ring according to claim 1, wherein the core part (61) is formed of several core pieces (65).

7. The lock ring according to claim 1, wherein the twisted wire part (62) is formed of spring material whereas the core part (61) comprises shape memory alloy.

8. The lock ring according to claim 1, wherein the core part (61) is formed of spring material whereas the twisted wire part (62) comprises shape memory alloy.

9. The lock ring according to claim 1, wherein the twisted wire part (62) is formed of steel whereas the core part (61) comprises shape memory alloy.

10. The lock ring according to claim 1, wherein the core part (61) is formed of steel whereas the twisted wire part (62) comprises shape memory alloy.

11. The lock ring according to claim 1, wherein the core part comprises several strands of shape memory alloy.

12. The lock ring according to claim 2, wherein the core part (61) of the lock ring (6) comprises shape memory alloy.

13. The lock ring according to claim 2, wherein the twisted wire part (62) of the lock ring comprises shape memory alloy.

14. The lock ring according to claim 2, wherein the core part (61) is formed of several core pieces (65).

15. The lock ring according to claim 3, wherein the core part (61) of the lock ring (6) comprises shape memory alloy.

16. The lock ring according to claim 3, wherein the twisted wire part (62) of the lock ring comprises shape memory alloy.

17. The lock ring according to claim 3, wherein the core part (61) is formed of several core pieces (65).

18. The lock ring according to claim 4, wherein the twisted wire part (62) of the lock ring comprises shape memory alloy.

19. The lock ring according to claim 4, wherein the core part (61) is formed of several core pieces (65).

20. The lock ring according to claim 5, wherein the core part (61) is formed of several core pieces (65).

* * * * *